(12) United States Patent
Lai et al.

(10) Patent No.: US 9,352,472 B1
(45) Date of Patent: May 31, 2016

(54) DIRECTION-ADJUSTABLE JIG

(71) Applicant: CONCRAFT HOLDING CO., LTD., Grand Cayman (KY)

(72) Inventors: Shih-Chia Lai, Grand Cayman (KY); Chin-Hsing Lee, Grand Cayman (KY); Tong Su, Grand Cayman (KY); Jie Wu, Grand Cayman (KY)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 0 days.

(21) Appl. No.: 14/719,813

(22) Filed: May 22, 2015

(30) Foreign Application Priority Data

Nov. 26, 2014 (TW) .............................. 103220965 U

(51) Int. Cl.
*B25J 17/00* (2006.01)
*B25J 18/00* (2006.01)

(52) U.S. Cl.
CPC . *B25J 17/00* (2013.01); *B25J 18/00* (2013.01)

(58) Field of Classification Search
CPC ............ B25B 1/00; B25B 11/02; B26D 7/20; B23Q 3/08
See application file for complete search history.

(56) References Cited

U.S. PATENT DOCUMENTS

| | | | | |
|---|---|---|---|---|
| 4,120,490 A | * | 10/1978 | Carossino | B23Q 3/103 269/209 |
| 5,234,205 A | * | 8/1993 | Shanley | B21D 37/14 269/101 |
| 5,542,654 A | * | 8/1996 | Johanson | B25B 1/10 269/137 |
| 5,695,178 A | * | 12/1997 | Lenzkes | B25B 5/006 269/93 |
| 5,868,183 A | * | 2/1999 | Kozyrski | A47G 1/10 144/136.1 |
| 6,698,739 B1 | * | 3/2004 | McKim | B25B 1/08 269/234 |

* cited by examiner

*Primary Examiner* — Lee D Wilson
(74) *Attorney, Agent, or Firm* — Rabin & Berdo, P.C.

(57) ABSTRACT

The instant disclosure relates to a direction-adjustable jig, which includes a base, a sliding member, and a hinge member. The base is topped with a platform having a pair of guide rails. The two guide rails extend in opposite directions and are parallel to each other. The sliding member is disposed on the platform and capable of reciprocating motion. The hinge member is disposed on the platform and pivotally connected to one end of the sliding member. The hinge member is rotatable above the base. The hinge member further has a pair of protruding guide teeth. The guide teeth are perpendicular to each other and insertable into the guide rails.

Through the motion of the sliding member on the platform, the guide teeth of the hinge member can be inserted into respective guide rails, such that the hinge member can rotate above the base and change its direction.

9 Claims, 9 Drawing Sheets

DIRECTION-ADJUSTABLE JIG

CROSS-REFERENCES TO RELATED APPLICATIONS

This non-provisional application claims priority under 35 U.S.C. §119(a) on Patent Application No. 103220965 filed in Taiwan, R.O.C. on 2014 Nov. 26, the entire contents of which are hereby incorporated by reference.

BACKGROUND

1. Technical Field

The instant disclosure relates to a jig, in particular for a robotic arm in which the jig is capable of translating an artifact between two mutually perpendicular planes in a three-dimensional (3-D) space.

2. Related Art

Automated equipment is primarily used for reducing manufacturing time and enhancing production efficiency. Typically, to reduce equipment cost, a robotic arm is employed to operate with a jig.

Most jigs are only capable of moving an artifact in a single plane or along a single axis. For rotational motion, a robotic arm is needed to achieve the operation.

For automated equipment, a robot arm is usually furnished with a gripper to pick up artifacts. However, the gripper normally is rotatable only in a single plane. If the gripper is made to operate multi-dimensionally, the cost of automated equipment would increase with added burden to the user, although the production efficiency could be improved.

In light of this, for use with a robotic arm, how to provide a jig that is capable of manipulating an artifact between two mutually perpendicular planes in a 3-D space is the main objective of the instant disclosure.

SUMMARY

To achieve this objective, a direction-adjustable jig is provided by the instant disclosure. The jig comprises a base, a sliding member, and a hinge member. The base is topped with a platform, which is formed concavedly with two oppositely elongated guide rails in a parallel manner. The sliding member is slidably disposed on the platform and movable in a reciprocating fashion. The hinge member is rotatably disposed on the platform and pivotally connected to one end of the sliding member. The hinge member is protrudingly formed with a pair of guide teeth insertably mated to the guide rails. The guide teeth are perpendicularly arranged with each other on the hinge member corresponding to the guide rails.

Consequently, when the sliding member is traversing on the platform, the guide teeth of the hinge member are inserted into the guide rails. Thus, the hinge member is able to rotate and change direction with respect to the base.

The hinge member further has a receiving surface facing away from the sliding member. The receiving surface can face different directions in achieving direction-adjustable effect. The receiving surface is formed with a protrusion having at least one thru hole penetrating the hinge member.

A step portion is formed parallel to each of the guide rails on the base. The two step portions together define a guide slot, with the platform forming the bottom portion thereof. The sliding member has a slightly higher profile than the step portions. For the sliding member, each of the side portions thereof facing the corresponding step portion is formed with a rib. The ribs have a lower profile than the sliding member.

One end of the sliding member is pivotally connected by the hinge member. The connected end is defined by two joint portions protruding toward the hinge member. The joint portions together form a recess, which receives one end of the hinge member. Each joint portion is formed with a pivot hole aligned co-axially. The hinge member pivots with respect to a pivot axis defined by the pivot holes. The recess is further defined with an inwardly restricting groove, which embeddingly receives one of the guide teeth.

DETAILED DESCRIPTION

Figure 1:
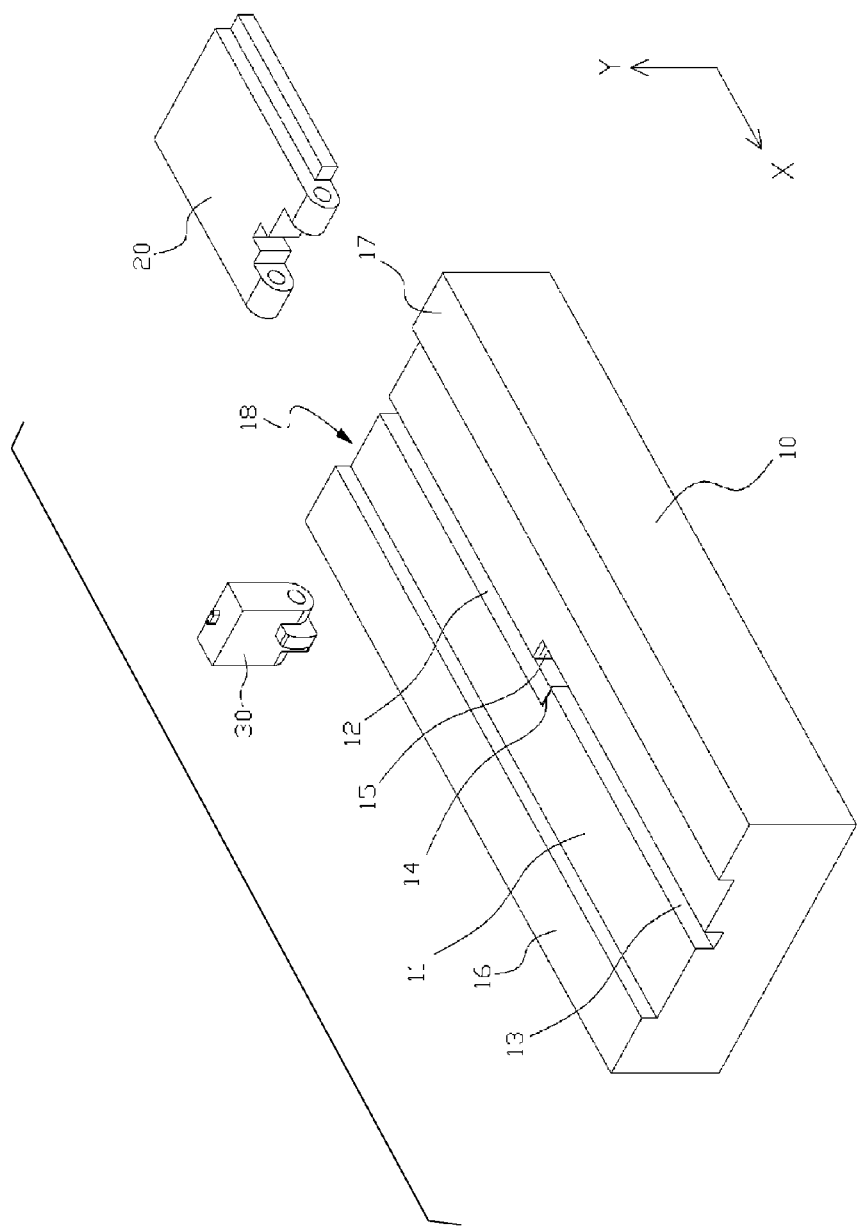
FIG. 1 is an exploded view of the instant disclosure.
Figure 2:
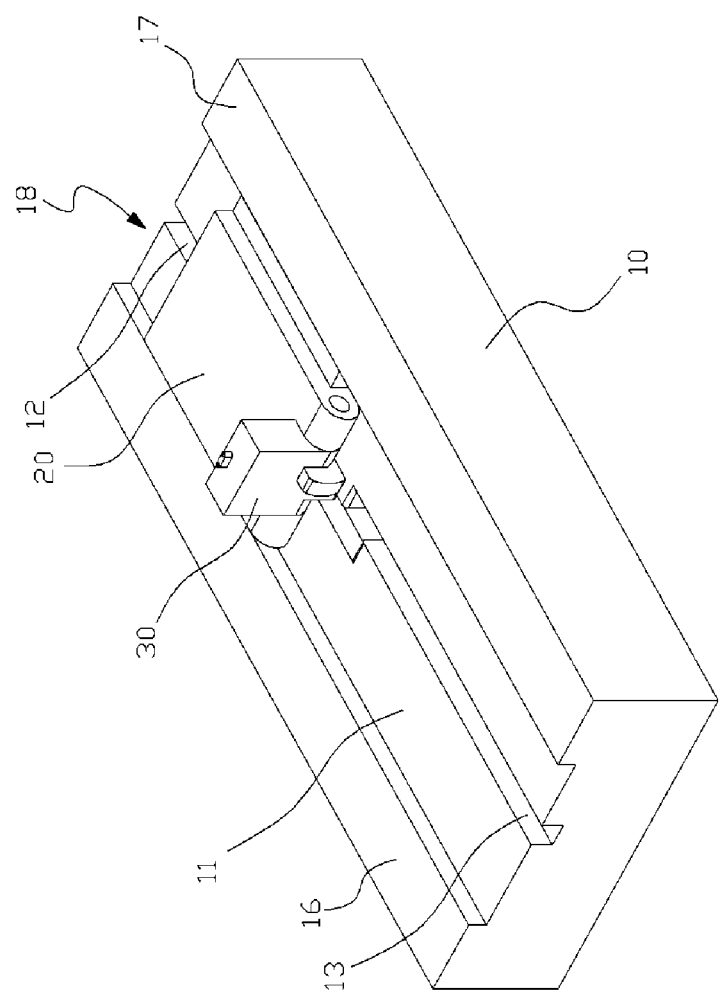
FIG. 2 is a perspective view of the instant disclosure.

FIGS. 1 and 2 show a jig of the instant disclosure. The jig is capable of orienting an artifact three dimensionally in a three dimensional (3-D) space. The artifact can be translated between two mutually perpendicular planes in a 3-D space. The jig comprises a base 10, a sliding member 20, and a hinge member 30.

The base 10 is topped with a platform 11. In the context of the instant disclosure, a first direction X and a second direction Y that are perpendicular to each other are defined. A first guide rail 12 and a second guide rail 13 are formed concavedly on the platform 11 toward the base 10. The second guide rail 13 extends longitudinally along the first direction X, while the first guide rail 12 extends parallel in an opposite direction. The first and second guide rails 12 and 13 have a first abutting surface 14 and a second abutting surface 15, respectively, arranged in an adjacent manner. In the present case, the first and second guide rails 12 and 13 can communicate with each other. However, in practice, the first and second guide rails 12 and 13 can be two independent guide rails isolated from each other. In addition, a first step portion 16 and a second step portion 17 are formed sideways from the first guide rail 12 and the second guide rail 13, respectively, on the base 10 in an upwardly protruding manner. The first and second step portions 16 and 17 together define a guide slot 18, such that the platform 11 constitutes the bottom surface of the guide slot 18.

Figure 3:
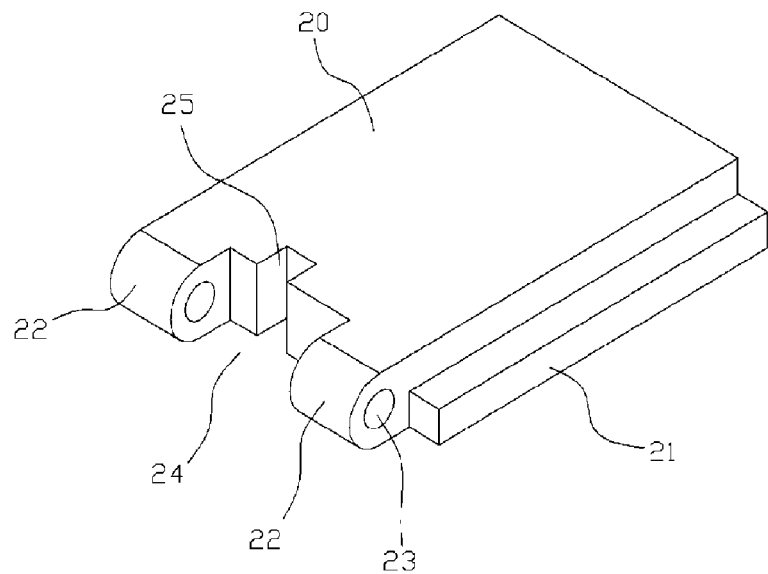
FIG. 3 is a perspective view of a sliding member of the instant disclosure.

Please refer to FIG. 3 for the sliding member 20. The sliding member 20 is slidably disposed in the guide slot 18 of the base 10. The sliding member 20 may slide back and forth along the first direction X. The sliding member 20 also has a slightly higher profile than the first and second step portions 16 and 17 of the base 10. A rib portion 21 is formed protrudingly on each of the opposite side portions of the sliding member 20, with the opposite side portions respectively facing the first and second step portions 16 and 17 of the base 10. The rib portions 21 have a slightly lower profile than the sliding member 20. Furthermore, a pair of joint portions 22 protrudes from one end of the sliding member 20 and is adjacent to the rib portions 21. Each of the joint portions 22 is formed with a pivot hole 23 aligned co-axially The joint portions 22 together define a recess 24, with the recess 24 having a restricting groove 25 formed inwardly towards the sliding member 20. The location of the restricting groove 25 is uniquely selected to correspond with the location of the first guide rail 12.

Figure 4:
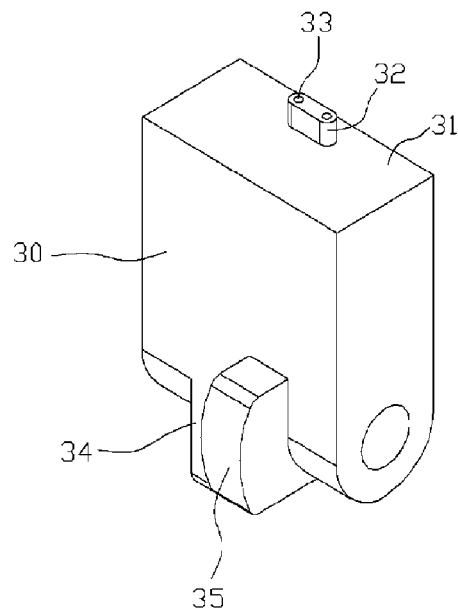
FIG. 4 is a perspective view of a hinge member of the instant disclosure.

The hinge member 30 is illustrated in FIG. 4. One end of the hinge member 30 is pivotally received by the recess 24 of the sliding member 20. Based on the pivot axis defined by the pivot holes 23, the hinge member 30 may rotate from the first direction X towards the second direction Y on the platform 10, via the recess 24 between the joint portions 22 on one end of the sliding member 20. The hinge member 30 has a receiving surface 31 formed on end thereof away from the sliding member 20. The receiving surface 31 projects outwardly and has a protrusion 32 formed entendingly thereon. A thru hole 33 is formed on the protrusion 32. The thru hole 33 is formed penetratingly through the hinge member 30 to communicate with a suctioning device or to mount a magnetic element (not shown), such that an artifact may be held at the tip of the protrusion 32. In practice, the thru hole 33 may be formed directly on receiving surface 31 of the hinge member 30. In that case, the artifact would be held directly on the receiving surface 31. The protrusion 32 is merely a preferred embodiment.

A first guide tooth 34 and a second guide tooth 35 arranged in a perpendicular relationship are formed on one side of the hinge member 30 adjacent to the recess 24. The first guide tooth 34 corresponds to the first guide rail 12 of the base 10. By pivoting the hinge member 30, the first guide tooth 34 is inserted into the first guide rail 12 or received by the restricting groove 25. The second guide tooth 35 corresponds to the second guide rail 13 of the base 10. Similarly, the pivot motion of the hinge member 30 makes the second guide tooth 35 be inserted into the second guide rail 13.

Figure 5A:
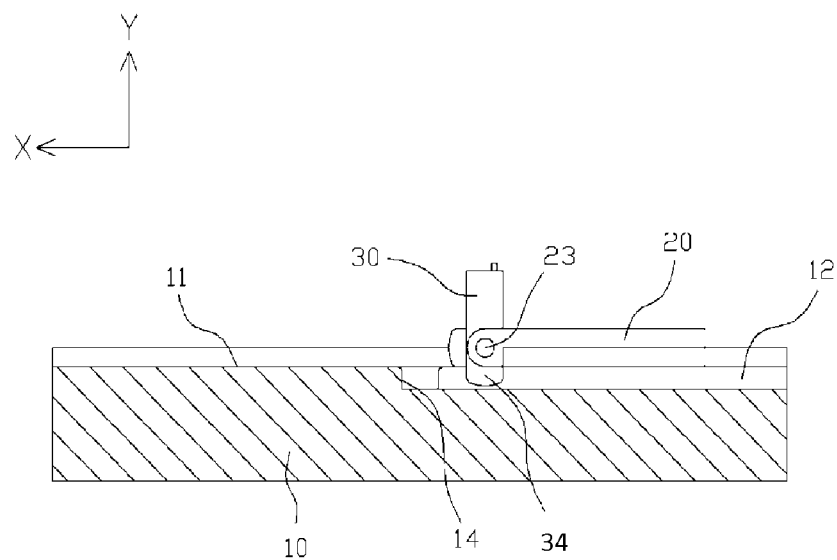
FIG. 5A~5E are schematic views of a first motion of the instant disclosure.
Figure 5B:
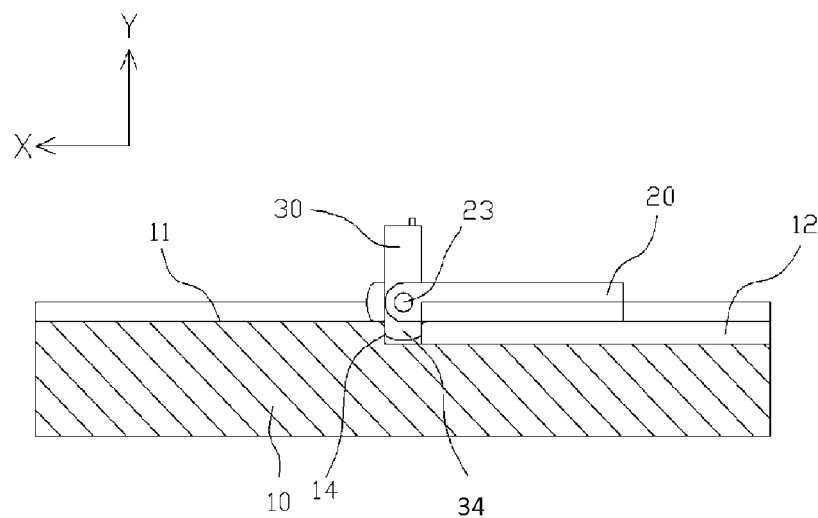
Figure 5C:
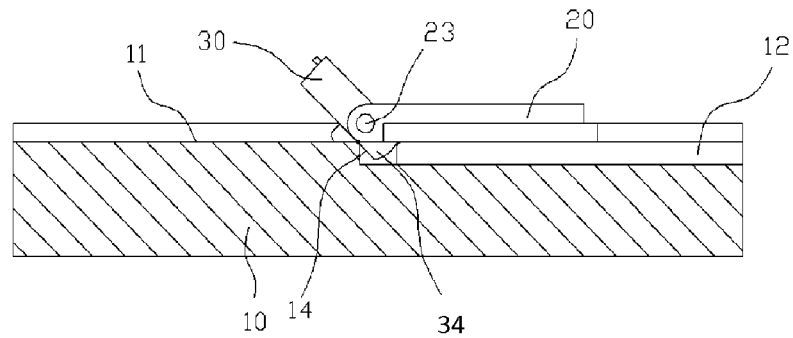
Figure 5D:
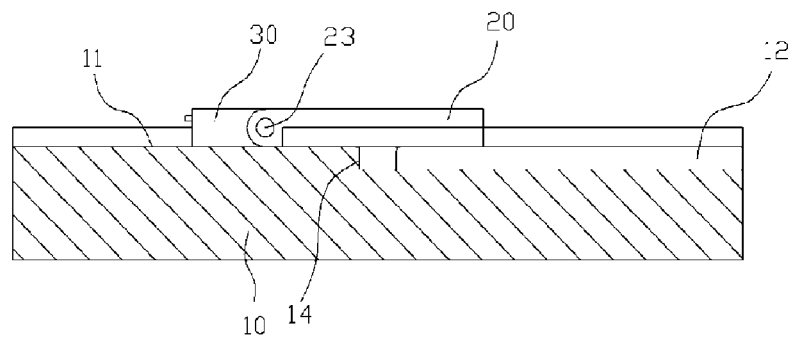
Figure 5E:
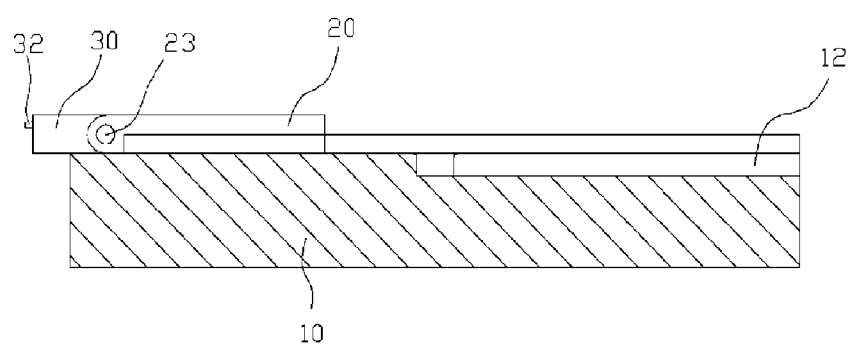

Please refer to FIGS. 5A~5E, which illustrate the operation of the jig of the instant disclosure. As can be seen in FIG. 5A, when the hinge member 30 is arranged perpendicularly with respect to the platform 11 on the base 10, the first guide tooth 34 of the hinge member 30 is inserted into the first guide rail 12. The first guide tooth 34 serves to guide the sliding member 20 in traversing on the platform 11 along the first direction X, so as to prevent the sliding member 20 from slipping off. As the sliding member 20 continues to move along the first direction X, the first guide tooth 34 of the hinge member 30 is eventually stopped by the first abutting surface 14 of the first guide rail 12, as shown in FIG. 5B. However, since the hinge member 30 is pivotally connected to the sliding member 20, the continuous motion of the sliding member 20 causes the hinge member 30 to rotate from the second direction Y towards the first direction X, at one end of the sliding member 20, as illustrated in FIG. 5C. The rotation of the hinge member 30 is based on the pivot axis defined by the pivot holes 23. The rotating motion is completed when the hinge member 30 is in parallel with the first direction X, such that the hinge member 30 lies flat against the platform 11, as depicted by FIG. 5D. Finally, as illustrated by FIG. 5E, the sliding member 20 is pushed to maintain its sliding motion against the platform 11, until the protrusion 32 emerges from the base 10.

Please refer to FIGS. 6A~6E for the following details. When the hinge member 30 is aimed toward the first direction X and parallel to the platform 11, the second guide teeth 35 is receivably inserted into the second guide rail 13. Thus, the sliding member 20 is utilized by the hinge member 30 to traverse along the first direction X on the platform 11.

Figure 6A:
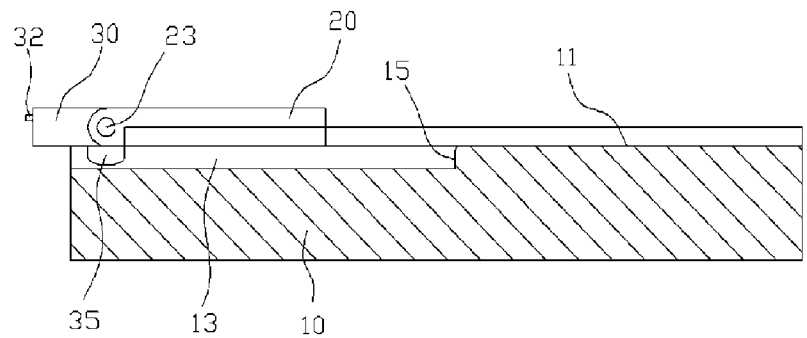
FIG. 6A~6E are schematic views of a second motion of the instant disclosure.
Figure 6B:
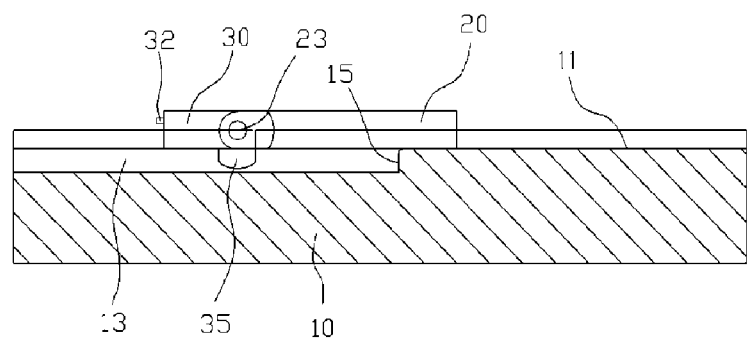
Figure 6C:
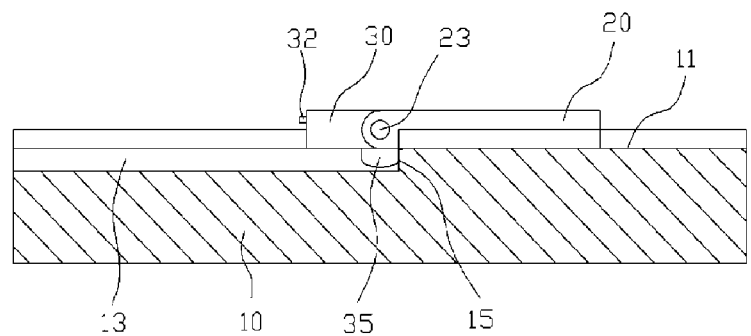
Figure 6D:
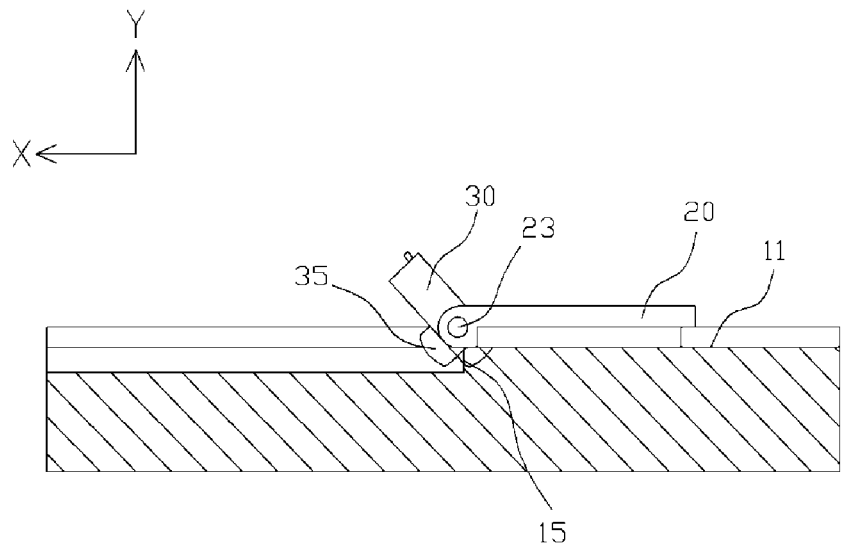
Figure 6E:
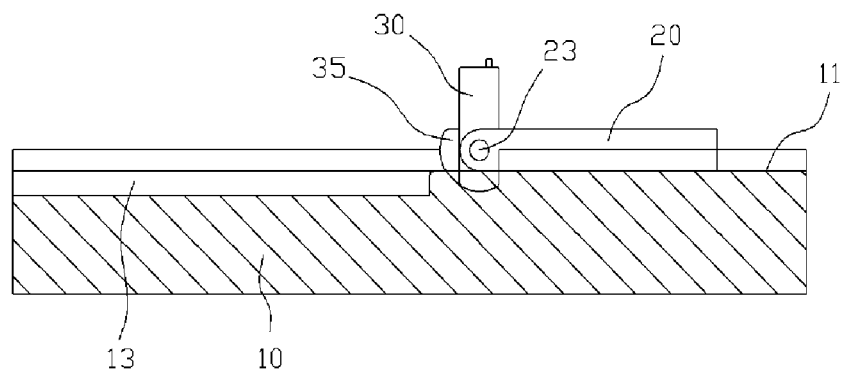

As the protrusion 32 of the hinge member 30 reaches the edge of the base 10 and protrudes outwardly, with reference to FIGS. 6B and 6C, the sliding member 20 will start to slide in the reverse direction. The sliding motion will continue until the second guide tooth 35 is in contact with the second abutting surface 15 of the second guide rail 13. Next, as shown in FIG. 6D, the hinge member 30 rotates from the first direction X to the second direction Y on the platform 11, with reference to the pivot axis defined by the pivot holes 23. The rotating motion is finished after the second guide tooth 35 has completely disengaged from the second guide rail 13. Consequently, the hinge member 30 returns to the vertical orientation along the second direction Y with respect to the platform 11. The second guide tooth 35 is supported by the platform 11, such that the hinge member 30 can be kept vertically along the second direction Y on the platform 11.

Based on the reciprocating motion illustrated in FIGS. 5A~5E and 6A~6E, the hinge member 30 is capable of rotating between the first direction X and the second direction Y. Thus, adjustment in direction is achieved by the hinge member 30.

Figure 7:
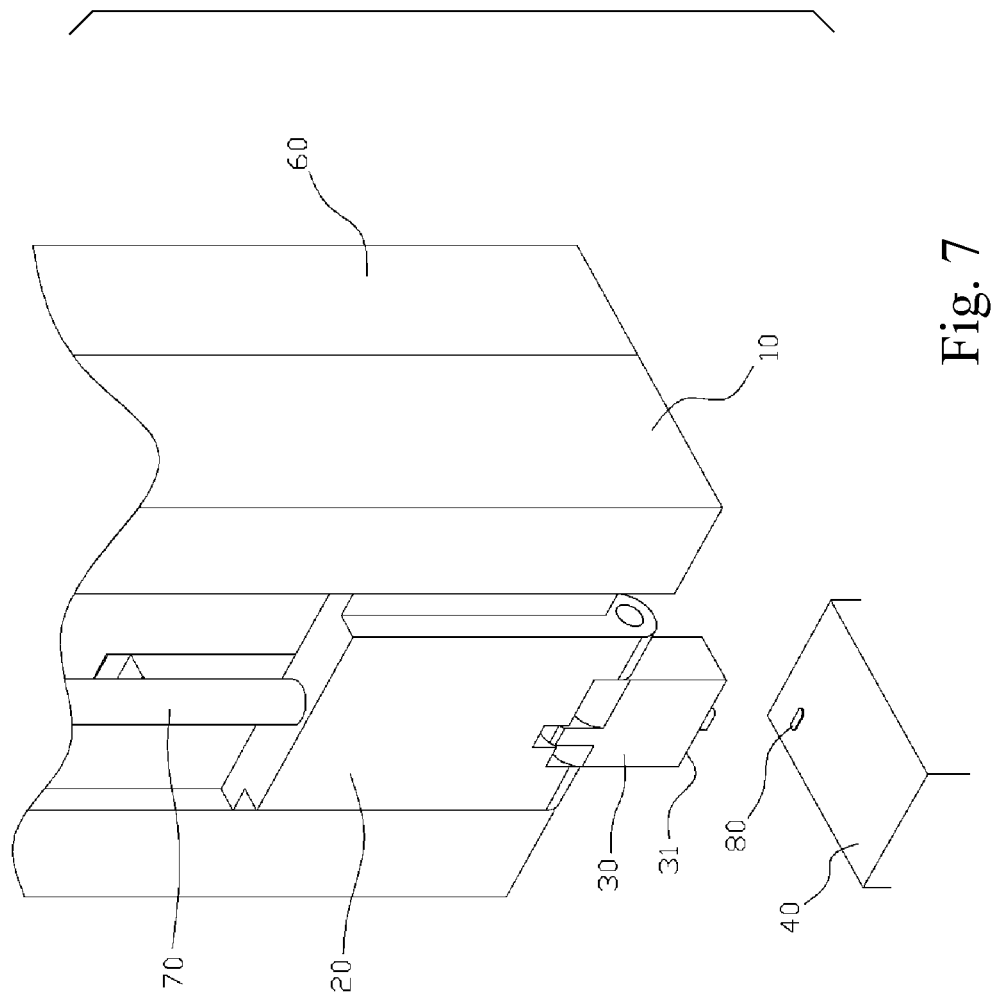
FIG. 7 is a schematic view of the instant disclosure in the XY plane.
Figure 8:
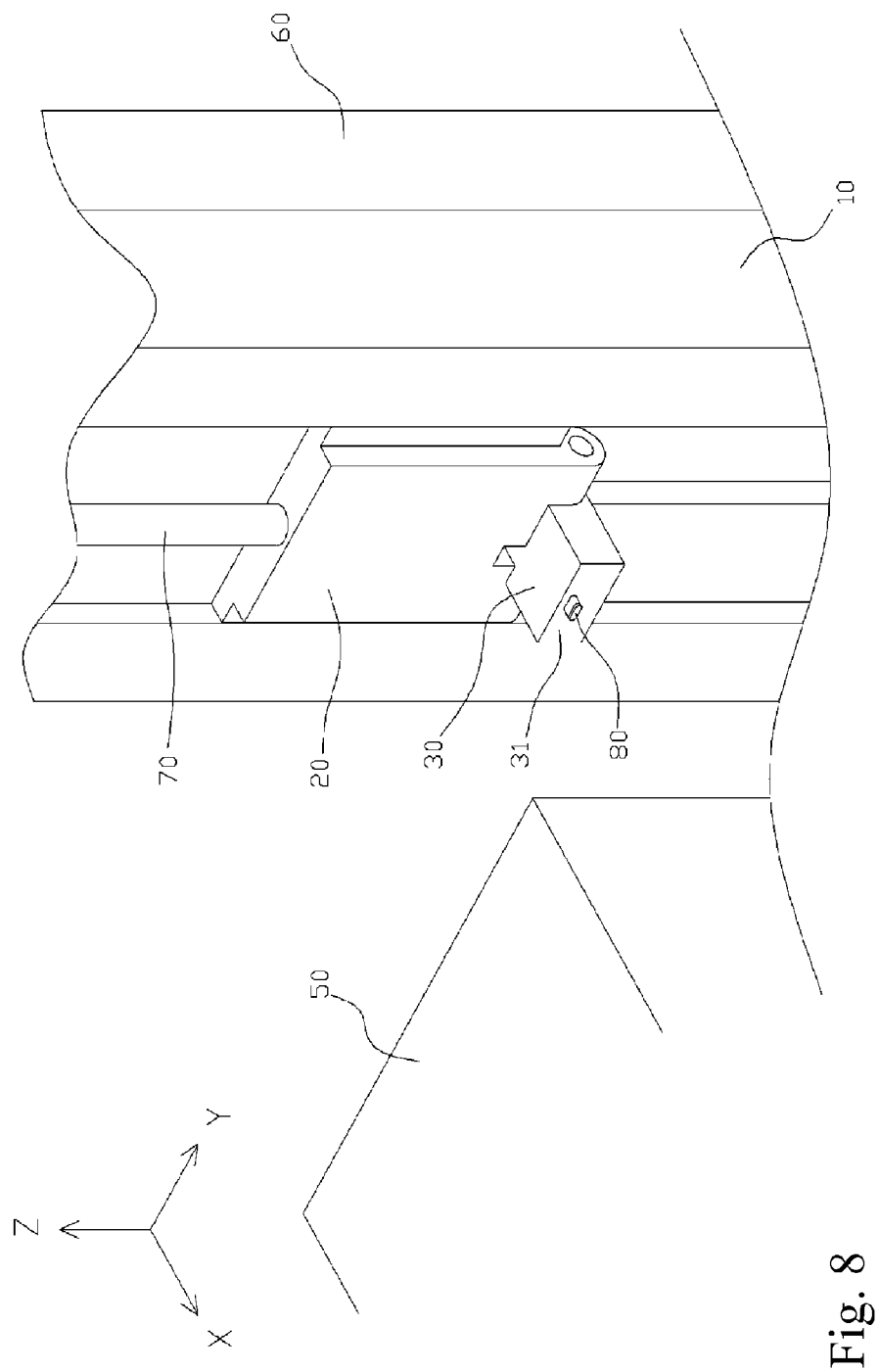
FIG. 8 is a schematic view of the instant disclosure in the YZ plane.

Please refer to FIGS. 7 and 8. The jig of the instant disclosure is applicable in a 3-D space. For example, an artifact 80 can be translated between two mutually perpendicular planes. One of the planes is the XY plane, and the other plane is the YZ plane. A first support table 40 and a second support table 50 are prepared for the XY plane and the YZ plane, respectively.

The base 10 can further be disposed on a 3D motioning mechanism 60, such as a robotic arm or other apparatus. The goal is to allow the base 10 to travel in the 3D space via the motioning mechanism 60. The sliding member 20 can further be driven by a reciprocating device 70. The reciprocating device 70 may be gas operated, hydraulic operated, or operated by other means to provide reciprocating motion. By being driven by the reciprocating device 70, the sliding member 20 is motion-enabled on the base 10.

When the artifact 80 is disposed on a first support table 40 in the XY plane, the base 10 is perpendicular to the XY plane. To translate the artifact 80 from the XY plane to the YZ plane, first, the base 10 is moved to be above the first support table 40 by the motioning mechanism 60. The sliding member 20 is pushed simultaneously by the reciprocating device 70, so that the hinge member 30 is parallel to the base 10, and the receiving surface 31 of the hinge member 30 is protrudingly exposed from one side of the base 10. Once the receiving surface 31 of the hinge member 30 is aligned with and above the artifact 80, the base 10 is moved toward the first support table 40 by the motioning mechanism 60. After the receiving surface 31 of the hinge member 30 is in contact with the artifact 80, the artifact 80 is held to the receiving surface 31 of the hinge member 30 by suctioning. The base 10 is then moved away in removing the artifact 80 from the first support table 40.

Next, the motioning mechanism 60 and the reciprocating device 70 are used, in order to move the base 10 and allow the sliding member 20 to traverse on the base 10 simultaneously. The operation brings the hinge member 30 to be perpendicular to the base 10, with the receiving surface 31 oriented in the YZ plane. In other words, the artifact 80 is translated into the YZ plane. The base 10 is then moved toward the second support table 50 to unload the artifact 80. Once the artifact 80 is received by the second support table 50, the base 10 is moved away to disengage the artifact 80 from the hinge member 30. Thus, the jig of the instant disclosure allows the artifact 80 to be translated in the 3D space.

In comparison with known technology, the jig of the instant disclosure is structurally simple and applicable to automated equipment, such that the artifact can be translated in a 3D space, while achieving the purpose of reducing equipment costs.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A direction-adjustable jig, comprising:
   a base topped with a platform, the platform defining a first direction and a second direction perpendicular to each other, the platform concavedly formed with a pair of guide rails, with one guide rail extending along the first direction and the other rail in an opposite direction;
   a sliding member disposed on the platform capable of reciprocating along the first direction; and
   a hinge member disposed on the platform and pivotally connected to one end of the sliding member and rotatable toward the second direction, the hinge member formed with a pair of guide teeth in a protruding manner for insertably mating with the guide rails, the guide teeth being perpendicular to each other.

2. The direction-adjustable jig of claim 1, wherein the hinge member is formed with a receiving surface away from the sliding member, and a protrusion is extended outwardly from the receiving surface.

3. The direction-adjustable jig of claim 2, wherein the protrusion has a thru hole penetrating the hinge member.

4. The direction-adjustable jig of claim 1, wherein a step portion is formed sideways from each of the guide rails on the base in a protruding and parallel manner, and wherein the step portions define a guide slot, with the platform forming the bottom portion of the guide slot.

5. The direction-adjustable jig of claim 4, wherein the sliding member has a slightly higher profile than the step portions.

6. The direction-adjustable jig of claim 4, wherein a rib is formed protrudingly on each of two opposite sides of the sliding member, and wherein the ribs are adjacent to respective step portions and have a lower profile than the sliding member.

7. The direction-adjustable jig of claim 1, wherein a pair of joint portions is formed protrudingly on the end of the sliding member pivotally connected by the hinge member, and wherein the joint portions form a recess for receiving one end of the hinge member.

8. The direction-adjustable jig of claim 7, wherein each joint portion is formed with a pin hole aligned co-axially that defines a pivot axis for the hinge member.

9. The direction-adjustable jig of claim 7, wherein the sliding member is formed inwardly with a restricting groove for receiving one of the guide teeth of the hinge member.

* * * * *